United States Patent Office 3,060,187
Patented Oct. 23, 1962

3,060,187
1,2,5-THIADIAZOLE-3-CARBOXYLIC ACID AND RELATED DERIVATIVE AND PROCESSES
Marvin Carmack, Bloomington, Ind., and Leonard M. Weinstock, Clifton, N.J., assignors to Indiana University Foundation, Bloomington, Ind., a corporation of Indiana
No Drawing. Filed Dec. 4, 1959, Ser. No. 857,260
18 Claims. (Cl. 260—302)

This invention relates to new organic heterocyclic compounds wherein the hetero-atoms are nitrogen and sulfur and to methods of preparing such compounds. More specifically, it is concerned with 1,2,5-thiadiazole-3-carboxylic acid and with derivatives thereof particularly the esters, amide, hydrazide, and salts thereof, and to methods for preparing these compounds. In addition, it relates to 1,2,5-thiadiazole-3-carboxylic acid azide and with methods of making it.

Although the scientific literature is replete with disclosures and descriptions of many organic heterocyclic compounds, 3-mono-substituted 1,2,5-thiadiazoles were unknown prior to the present invention. It is an object of this invention to provide such compounds as well as to provide synthesis of such substances by selective mono-decarboxylation of 1,2,5 - thiadiazoles - 3,4 - dicarboxylic acid or its monoester.

1,2,5-thiadiazole-3-carboxylic acid has the following structural formula:

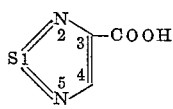

In accordance with this invention, 1,2,5-thiadiazole-3-carboxylic acid can be prepared by mono-decarboxylation of 1,2,5-thiadiazole-3,4-dicarboxylic acid and the monocarboxy compound in turn can be converted to the 1,2,5-thiadiazole-3-carboxylic acid azide by the process pictured structurally below:

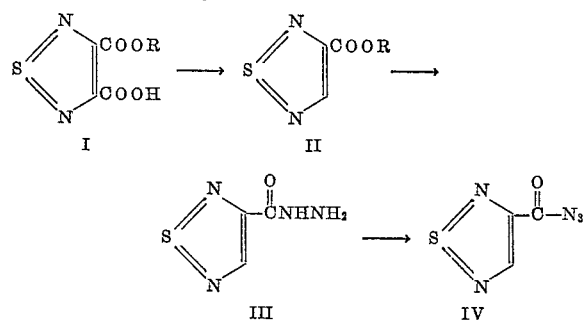

where R is hydrogen or lower alkyl.

1,2,5-thiadiazole-3-carboxylic acid azide, Compound IV, is active against soil fungi such as Fusarium and against free living nematodes such as *Panagrellus revividus* and is thus useful as a soil antifungal agent and as a nematocide.

The 1,2,5-thiadiazole-3,4-dicarboxylic acid or the mono ester thereof shown as the starting material in the first step of the synthesis is prepared by the process described in U.S. Serial No. 750,419, filed July 23, 1958 by Marvin Carmack et al.; now Patent No. 2,980,687. In general, these compounds are prepared from the known compound, 4-nitro-2,1,3-benzothiadiazole by oxidation preferably by treatment with an alkali or alkaline earth metal permanganate. The oxidation advantageously is effected with potassium permanganate in an aqueous reaction medium at between about 40–100° C. A slight excess of permanganate provides a satisfactory oxidation, although slightly larger quantities can be used if desired. The 1,2,5-thiadiazole-3,4-dicarboxylic acid obtained as a water soluble salt by this reaction then is made strongly acidic with nitric acid and silver nitrate is added to precipitate the insoluble mono-silver salt. This salt then either can be converted to the free acid by treatment with a mineral acid, as HCl, or converted to the mono-alkyl ester by reaction with an alkyl iodide in an organic solvent.

In the first step of the synthesis of the novel compounds of the present invention, set forth in the above flowsheet, 1,2,5-thiadiazole-3,4-dicarboxylic acid, or a mono-lower alkyl ester thereof, Compound I, is heated at elevated temperatures to bring about the selective removal of one of the carboxylic acid groups. The decarboxylation can be brought about in the absence of a solvent or in a suitable solvent medium.

A preferred method for making 1,2,5-thiadiazole-3-carboxylic acid or a lower-alkyl ester of 1,2,5-thiadiazole 3-carboxylic acid comprises heating the 3,4-dicarboxylic acid compound or its monoester advantageously in the presence of a high boiling organic solvent at temperatures of 140–200° C., and preferably at temperatures of about 150–175° C. It is desirable, although not essential, that the solvent have a boiling point substantially the same as the preferred reaction temperature, so that the decarboxylation can be carried out by refluxing the mixture at atmospheric pressure. Preferred liquid media for carrying out this step of the process are high boiling hydrocarbons as mesitylene and the like or ethers such as diethyleneglycol diethyl ether, phenetole, and anisole, and the like.

When the preferred operating temperatures of 150–175° C. are used, the production of the desired product ordinarily is substantially complete in about 30–90 minutes. In this way, 1,2,5-thiadiazole-3-carboxylic acid or a lower-alkyl ester thereof, such as the methyl, ethyl, or isopropyl and the like esters are produced from 1,2,5-thiadiazole-3,4-dicarboxylic acid or from the appropriate mono lower alkyl ester. The end products, identified as structure II in the above flow sheet, are recovered from the reaction mixture either by crystallization in the cold or, particularly in the case of the esters, by distillation.

These end products, and particularly the lower alkyl esters of 1,2,5-thiadiazole-3-carboxylic acid, are new compounds and are important intermediates necessary for the preparation of the 1,2,5-thiadiazole-3-carboxylic acid azide.

Alternatively, the conversion of the disubstituted product of Formula I to the 3-mono substituted product of Formula II can be achieved by heating the starting material in the absence of a solvent or diluent. 1,2,5-thiadiazole-3,4-dicarboxylic acid itself is conveniently converted to 1,2,5-thiadiazole-3-carboxylic acid by heating at about 175–200° C. until evolution of carbon dioxide is substantially complete. Under these reaction conditions the desired mono carboxylic acid sublimes from the reaction mixture and is substantially purified by such sublimation. It may be further purified, if desired, by recrystallization from suitable solvents such as nitro methane.

A 3-lower alkyl ester of 1,2,5-thiadiazole-3,4-dicarboxylic acid also can be selectively decarboxylated by direct heating of the ester, such as the methyl, ethyl, propyl, or butyl ester. The process preferably is brought about at temperatures of about 120–145° C. The reaction is rapid and, under preferred conditions, is ordinarily complete in 15–30 minutes. The monoesters, Formula II, thus obtained can be distilled from the reaction mixture as the decarboxylation proceeds.

The free acid and the alkyl esters defined generically by Formula II hereinabove can be converted one to the other if desired. Thus, 1,2,5-thiadiazole-3-carboxylic acid can be esterified by treatment with alcoholic hydrogen halide, the ester which is formed being dependent upon the alcohol employed. For example, treatment of the free acid with methanolic or ethanolic hydrogen chloride yields respectively the methyl and ethyl ester thereof.

In an additional embodiment of the invention, salts of 1,2,5-thiadiazole-3-carboxylic acid can be prepared by treating the free acid with a suitable base, such as sodium hydroxide, potassium hydroxide, ammonium hydroxide, sodium carbonate and the like. The salts are sometimes preferred over the free acid and may also be employed as intermediates in the purification of the acid.

In the second step of the overall process previously referred to, the hydrazide of 1,2,5-thiadiazole-3-carboxylic acid, Formula III above, is prepared from a lower alkyl ester of 1,2,5-thiadiazole-3-carboxylic acid by treating the ester with excess hydrazine. This reaction is preferably carried out in a solvent medium comprising a lower alkanol such as methanol, ethanol, or isopropanol and the like, or in the presence of excess hydrazine. Formation of the hydrazide is effected by warming the reaction mixture for a short period of time. Normally, the hydrazide will precipitate from the reaction mixture and is readily purified by recrystallization from an organic solvent such as ethanol or isopropanol.

In the final step, 1,2,5-thiadiazole-3-carboxylic acid hydrazide, Formula III, is treated with an alkali metal nitrite in order to form the azide of 1,2,5-thiadiazole-3-carboxylic acid (Compound IV, hereinabove). This reaction can be brought about in an aqueous acidic solvent medium. In a preferred embodiment of the reaction, an alkali metal nitrite such as sodium nitrite is added in solution to a strongly acidic solution of 1,2,5-thiadiazole-3-carboxylic acid hydrazide. The reaction is conveniently carried out at between about 0–5° C., although it can also be carried out at temperatures of up to about 30° C., if desired. The azide precipitates from the reaction medium and is readily recovered by conventional techniques such as by filtration or centrifugation.

The following examples are given for purposes of illustration and not by way of limitation:

EXAMPLE 1

1,2,5-Thiadiazole-3-Carboxylic Acid 100 mg. of 1,2,5-thiadiazole-3,4-dicarboxylic acid is added to a six inch test tube submerged one-third in an oil bath. The tube is heated to 185° C. whereupon simultaneous decarboxylation and sublimination takes place. The bottom of the test tube, which contains some dark material, is cut away and the mono acid is scraped from the walls of the upper part of the tube. It weighs 58 mg. The products, 1,2,5-thiadiazole-3-carboxylic acid, melts at 163–164° C.

Analysis calculated for $C_3H_2N_2SO_2$: C, 27.68; H, 1.55; N, 21.53; S, 24.64. Found: C, 27.78; H, 1.58; N, 22.11; S, 24.35.

EXAMPLE 2

1,2,5-Thiadiazole-3-Carboxylic Acid

Three grams of 1,2,5-thiadiazole-3,4-dicarboxylic acid is added to 10 ml. of phenetole and the mixture is heated to 160° C. After about one hour the solution is cooled in ice and the precipitate, 1,2,5-thiadiazole-3-carboxylic acid, collected by suction filtration. After two recrystallizations from nitromethane the product melts at 162–164° C.

EXAMPLE 3

Ethyl 1,2,5-Thiadiazole-3-Carboxylate

Two grams of 1,2,5-thiadiazole-3-carboxylic acid is suspended in 10 ml. of absolute ethanol and the mixture cooled in an ice bath. Hydrogen chloride gas is passed into the suspension for one hour and the mixture then is allowed to stand for 2½ days at room temperature with occasional swirling. A small amount of solid material is removed by filtration and the ethanol then is evaporated under reduced pressure with gentle applications of steam. The liquid residue is dissolved in 10 ml. of ether and the solution dried over sodium sulfate. The clear solution is decanted from the sodium sulfate and the ether then is removed by distillation at atmospheric pressure. The ester residue is distilled at 70–73° C./25 mm. to give substantially pure ethyl 1,2,5-thiadiazole-3-carboxylate.

Analysis calculated for $C_5H_6N_2SO_2$: C, 37.96; H, 3.82; N, 17.71; S, 20.27. Found: C, 38.34; H, 3.67; N, 18.04; S, 19.97.

EXAMPLE 4

1,2,5-Thiadiazole-3-Carboxamide

Ethyl 1,2,5-thiadiazole-3-carboxylate (630 mg.) is dissolved in 5 ml. of ethanol and the mixture then cooled in an ice bath. Dry ammonia gas is passed into the solution for 20 minutes and the mixture allowed to stand for one day at room temperature and then chilled in an ice bath. The white crystalline precipitate of 1,2,5-thiadiazole-3-carboxamide is separated by suction filtration and air-dried. The product weighs 460 mg. and melts at 193–194° C.

Analysis calculated for $C_3H_3N_3SO$: C, 27.86; H, 2.34; N, 32.54; S, 24.83. Found: C, 28.37, 28.57; H, 2.52, 2.47; N, 32.66, 32.17; S, 24.61, 24.71.

EXAMPLE 5

1,2,5-Thiadiazole-3-Carboxylic Acid Hydrazide

Ethyl 1,2,5-thiadiazole-3-carboxylate (458 mg.) is dissolved in 5 ml. of ethanol and 0.4 ml. of 95% hydrazine added to the solution. The mixture warms slightly, whereupon it turns yellow and within a few seconds solidifies. The solid, 1,2,5-thiadiazole-3-carboxylic acid hydrazide, after recrystallization from absolute ethanol and drying in air, melts at 153–155° C. Two more recrystallizations raise the melting point to 155–156° C.

Analysis calculated for $C_3H_4N_4SO$: C, 24.99; H, 2.80; N, 38.87; S, 22.24. Found: C, 25.19; H, 2.86; N, 39.28; S, 22.13.

EXAMPLE 6

Methyl 1,2,5-Thiadiazole-3-Carboxylate

Three grams of mono-methyl 1,2,5-thiadiazole-3,4-dicarboxylate is charged to a Spaeth bulb and heated at 135° C. for 15 minutes. The tube then is evacuated with the aid of a water aspirator and the heating continued as simultaneous decarboxylation and distillation of the product takes place. When all of the methyl 1,2,5-thiadiazole-3-carboxylate has distilled, the product is collected; it weighs 2.1 grams. The ester, initially obtained as an oil, quickly crystallizes to a solid, melting point 35–40° C. This ester can be converted in good yield to both the amide and hydrazide by the method described in Examples 4 and 5.

EXAMPLE 7

1,2,5-Thiadiazole-3-Carboxylic Acid Azide

The hydrazide of 1,2,5-thiadiazole-3-carboxylic acid (1.44 g., obtained as described in Example 5) is dissolved in a mixture of 15 ml. of water and 2 ml. of 6 N hydrochloric acid. This solution is cooled to 0° C. and a solution of 0.69 gram sodium nitrite in 5 ml. of water is added. The white azide precipitates at once, is collected by suction filtration and dried at room temperature. The product melts at 67° C. with gas evolution.

While the above examples describe the preparation of certain compounds which are illustrative of compounds of of this invention, it is to be understood that the invention is not to be limited by these examples but is to be understood to embrace variations and modifications thereof which fall within the scope of the appended claims.

What is claimed is:
1. 1,2,5-thiadiazole-3-carboxylic acid.
2. Lower alkyl 1,2,5-thiadiazole-3-carboxylate.
3. Ethyl 1,2,5-thiadiazole-3-carboxylate.
4. Methyl 1,2,5-thiadiazole-3-carboxylate.
5. 1,2,5-thiadiazole-3-carboxylic acid azide.
6. The hydrazide of 1,2,5-thiadiazole-3-carboxylic acid.
7. An alkali metal salt of 1,2,5-thiadiazole-3-carboxylic acid.
8. The process for producing 1,2,5-thiadiazole-3-carboxylic acid which comprises heating 1,2,5-thiadiazole-3,4-dicarboxylic acid at a temperature of about 120–200° C.
9. The process of claim 8 wherein the reaction is carried out at 150–175° C. in phenetole.
10. The process for producing a lower-alkyl 1,2,5-thiadiazole-3-carboxylate which comprises heating a mono-lower-alkyl ester of 1,2,5-thiadiazole-3,4-dicarboxylic acid at about 120–145° C.
11. The process for producing methyl 1,2,5-thiadiazole-3-carboxylate which comprises heating mono-methyl ester of 1,2,5-thiadiazole-3,4-dicarboxylic acid at about 120–145° C.
12. The process for producing ethyl 1,2,5-thiadiazole-3-carboxylate which comprises heating mono-ethyl ester of 1,2,5-thiadiazole-3,4-dicarboxylic acid at about 120–145° C.
13. The process which comprises reacting together hydrazine and a lower-alkyl 1,2,5-thiadiazole-3-carboxylate thereby producing 1,2,5-thiadiazole-3-carboxylic acid hydrazide.
14. The process of claim 13 wherein the lower-alkyl 1,2,5-thiadiazole-3-carboxylate is ethyl 1,2,5-thiadiazole-3-carboxylate.
15. The process of claim 13 wherein the lower-alkali 1,2,5-thiadiazole-3-carboxylate is methyl 1,2,5-thiadiazole-3-carboxylate.
16. The process for preparing 1,2,5-thiadiazole-3-carboxylic acid azide which comprises treating 1,2,5-thiadiazole-3-carboxylic acid hydrazide with an alkali metal nitrite in an acidic reaction medium.
17. The process for preparing 1,2,5-thiadiazole-3-carboxylic acid azide which comprises treating 1,2,5-thiadiazole-3-carboxylic acid hydrazide with sodium nitrite in an acidic reaction medium.
18. The process which comprises heating a compound of the formula

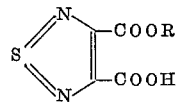

where R is a lower-alkyl at a temperature of about 120–200° C. thereby producing a lower-alkyl 1,2,5-thiadiazole-3-carboxylate of the formula

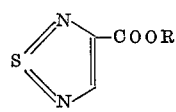

wherein R is as defined above, treating said latter substance with hydrazine to form 1,2,5-thiadiazole-3-carboxylic acid hydrazide and reacting said hydrazide with an alkali metal nitrite in an acidic medium to produce 1,2,5-thiadiazole-3-carboxylic acid azide.

References Cited in the file of this patent
UNITED STATES PATENTS
2,980,687    Carmack _____ Apr. 18, 1961
OTHER REFERENCES
Khaletskii et al.: Chem. Abstracts, vol. 52, col. 4605–6 (1958).